United States Patent
Lane et al.

[19]

[11] Patent Number: 5,951,066
[45] Date of Patent: Sep. 14, 1999

[54] CONNECTING SYSTEM FOR WELLHEAD COMPONENTS

[75] Inventors: F. Jeffery Lane, Houston; Heinrich H. Lang, The Woodlands, both of Tex.

[73] Assignee: ERC Industries, Inc., Houston, Tex.

[21] Appl. No.: 09/027,639

[22] Filed: Feb. 23, 1998

[51] Int. Cl.[6] .................................................. F16L 19/00
[52] U.S. Cl. ........................... 285/364; 285/406; 285/411
[58] Field of Search ........................... 285/123.8, 123.13, 285/123.14, 123.4, 363, 364, 406, 415, 309, 404, 411

[56] References Cited

U.S. PATENT DOCUMENTS

| | | |
|---|---|---|
| 1,989,679 | 2/1935 | Broussard . |
| 2,542,302 | 2/1951 | Barker . |
| 2,610,689 | 9/1952 | Eckel . |
| 3,155,401 | 11/1964 | Musolf . |
| 3,297,344 | 1/1967 | Hanes . |
| 3,455,578 | 7/1969 | Hanes . |
| 3,844,127 | 10/1974 | Koop, Jr. et al. . |
| 4,606,557 | 8/1986 | Coffey . |
| 4,848,808 | 7/1989 | Pannell et al. ................ 285/404 X |
| 5,149,143 | 9/1992 | Howell ........................ 285/404 X |
| 5,158,326 | 10/1992 | Anderson et al. . |

*Primary Examiner*—Janet M. Wilkens
*Assistant Examiner*—Karlena D. Schwing
*Attorney, Agent, or Firm*—Head Johnson & Kachigian

[57] ABSTRACT

A system for connecting wellhead components that are abutted in axial alignment in which each component has an increased external diameter circumferential hub portion at an end thereof, the system including a toroidal connector surrounding adjacently positioned hub portions, a plurality of C-segments retained by the toroidal connector and positioning bolts received in spaced apart threaded opening in the connector, each bolt having an inner end in engagement with a C-segment and an outer end extending radially of and exteriorly of the connector by which each C-segment may be inwardly radially advanced to engage opposed sides of the hubs.

10 Claims, 5 Drawing Sheets

CONNECTING SYSTEM FOR WELLHEAD COMPONENTS

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention is concerned with a connector for wellhead components such as wellhead housings, blowout preventer components and other similar assemblies which are mounted in abutted axial alignment in making up a complete wellhead structure.

In order to assemble a wellhead system for an oil or gas well it is necessary to be able to couple together in abutted vertical axial alignment tubular components that vary from well to well, depending upon the status of the well, that is, whether it is being drilled, completed or in the production phase. The stacked components typically include tees and blowout preventers as well as drill-through and completion components. In the drilling and completion of oil and gas wells it is frequently necessary to change the components making up the wellhead system and since they can be relatively large and heavy and must be constructed to sustain substantial internal pressure as well as bear the weight of tubing or casing suspended from the wellhead, they must be very securely attached to each other in a physically secure and leak proof manner. In addition, an important requirement is that the components be expeditiously installed or removed. That is, in the process of drilling, completing or working over an oil or gas well, it is important that the vertically stacked wellhead components be expeditiously interchanged since maintaining a drilling rig and crew at a well site is expensive. Minutes saved can add up to a significant amount during the process of drilling and completing a well. For this reason others in the past have provided systems for interconnecting wellhead components that are intended to decrease the time required for making changes and, at the same time, to provide for safety and leak proof connections.

For background information relating to systems for connecting wellhead components reference may be had to the following previously issued United States patents, including the patents cited as references in these issued patents:

| U.S. Pat. No. | INVENTOR | TITLE |
| --- | --- | --- |
| 1,989,679 | Broussard | Multiple Clamp Casing Head Control |
| 2,542,302 | Barker | Wellhead Construction |
| 2,610,689 | Eckel | Wellhead Seal |
| 3,155,401 | Musolf | Well Head Assembly |
| 3,297,344 | Hanes | Connectors For Well Parts |
| 3,455,578 | Hanes | Fluid Pressure Releasable Automatic Tool Joint |
| 3,844,127 | Koop Jr. et al | Floating Drilling Platform With Quick Disconnect Legs |
| 4,606,557 | Coffey | Subsea Wellhead Connector |
| 5,149,143 | Howell | Connector Assembly With Detachable Sleeve |
| 5,158,326 | Anderson et al | Casing Head Connector |

BRIEF SUMMARY OF THE INVENTION

A connection system for wellhead components is provided, a system that achieves secure interconnection between components in a time efficient, secure and substantially fail proof manner. The system is used to secure in vertical axial abutment aligned first and second wellhead components where each of the components has an increased external diameter circumferential integral hub portion at an end thereof. The ends being contiguous and in axial alignment with the integral hub portions in abutment or at least in substantial abutment with each other.

A toroidal member is positioned on the assembly to surround the abutted hubs of the wellhead components. A plurality of C-segments are retained by the toroidal member. Each of the C-segments is in the form of a short length segment of generally U-shaped vertical cross-sectional configuration having a recess in the forward face thereof that is configured to receive and conform to the abutted hub portions of adjacent wellhead members. The toroidal connector has a threaded opening therein for each of the segments.

Threadably received in each of the threaded openings in the toroidal connector is a threaded positioning bolt. Each of the positioning bolts has an inner end in engagement with a C-segment and an outer end that extends radially of and exteriorly of the toroidal connector. By rotating a positioning bolt, the radial position of its associated C-segment can be inwardly or outwardly radially advanced or retracted, depending upon the direction of rotation of the bolt.

When the toroidal connector and its associated C-segments and positioning bolt are placed in position to circumferentially surround abutted integral hubs of adjacent wellhead components and each of the bolts is rotated to threadably inwardly advance its associated C-segment, the C-segments are radially positioned to span the abutted circumferential hubs and thereby to retain the hubs in abutted relationship.

To disconnect one wellhead component from another, the positioning bolt are all rotated in the opposite direction, serving to outwardly radially withdraw each of the C-segments to move them out of engagement with the integral circumferential hubs of the wellhead components. With all of the C-segments fully withdrawn, the wellhead components can then be disassembled from each other.

Each of the positioning bolts preferably includes an integral inwardly extending cylindrical portion that is rotatably received within a radial opening through each of the C-segments. The outer end of each of the integral cylindrical portion of each of the positioning bolt is provided with threads to receive a nut by which each of the C-segments is thereby secured to a positioning bolt but in a manner to permit the positioning bolt to be rotated relative to the C-segment with which it is associated. In this manner, when the positioning bolts are rotated in one direction, the C-segments are radially outwardly withdrawn to permit the wellhead components to be separated.

A better understanding of the invention will be obtained from the following description of the preferred embodiments, taken in conjunction with the attached drawings and the claims.

DESCRIPTION OF THE DRAWINGS

FIG. 1 further shows a system of this invention for releasably securing the two wellhead components to each other, this figure shows the system in position to secure the wellhead components to each other.

DETAILED DESCRIPTION OF THE PREFERRED EMBODIMENT

Figure 1:
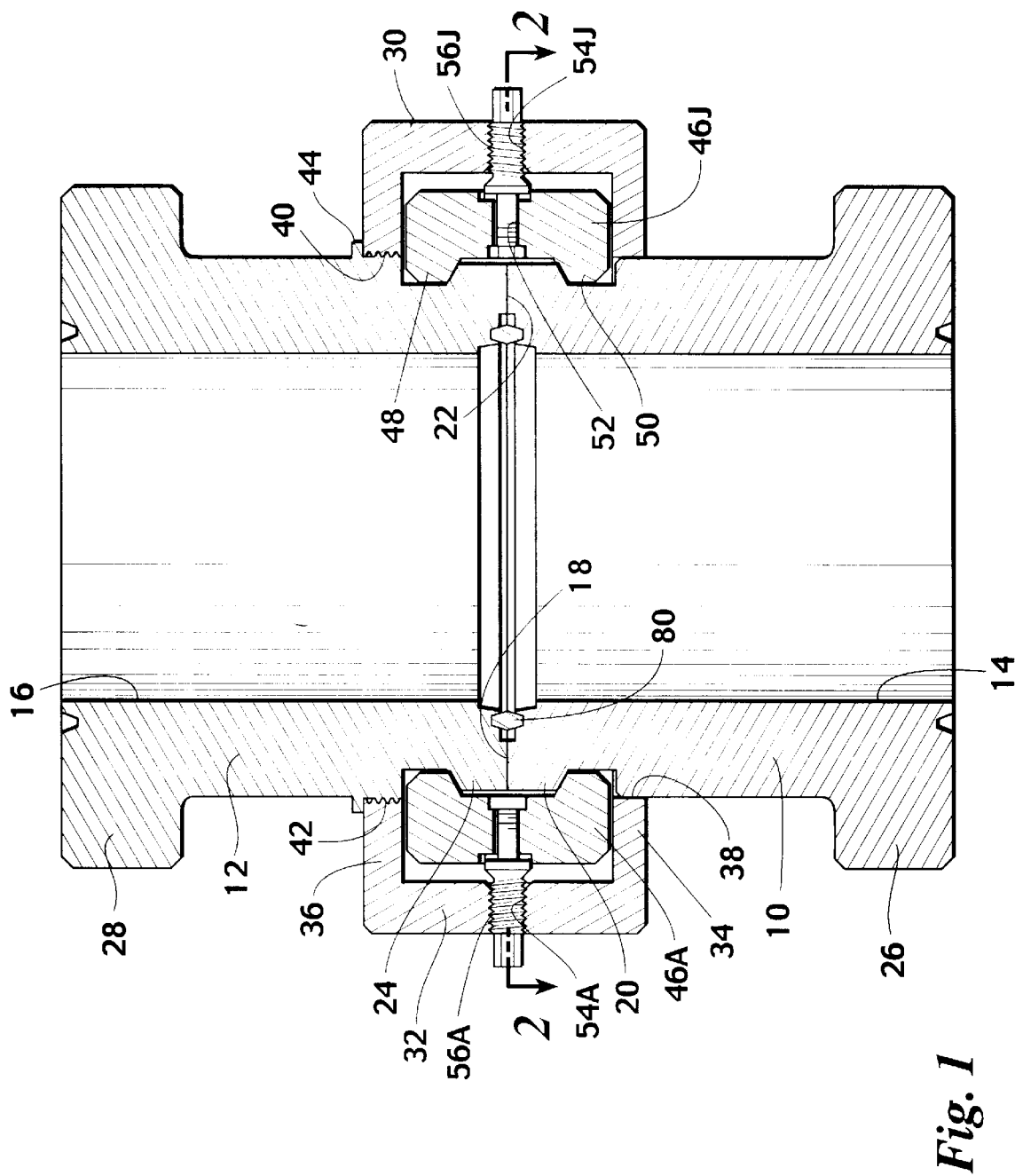
FIG. 1 is an elevational cross-sectional view of two wellhead components, each having at one end thereof an integral radially outwardly extending hub portion, the hub portions being positioned in abutment with each other.

Referring to the drawings and first to FIG. 1, the essence of the invention is illustrated in a highly simplified wellhead system consisting of two components shown in cross-sectional view. The two components are, as typical of wellhead elements, tubular and are arranged in vertical orientation. In the simplified system of FIG. 1, a first wellhead component is indicated by the numeral 10 and positioned in axial alignment on top of it is a second wellhead component 12. The wellhead components 10 and 12 are tubular, that is, they have axial openings 14 and 16 respectively that are supported in axial alignment in the interlocked structure. First component 10 has a top end 18 that has adjacent the top end, an integral, external, increased diameter circumferential hub portion 20. In like manner, second wellhead portion 12 has, adjacent a lower end 22, an integral, increased external diameter circumferential hub portion 24.

First wellhead component 10 has, at or adjacent the lower end thereof, an integral flange 26 and, in like manner, the second wellhead component 12 has adjacent an upper end thereof a flange 28, flanges 26 and 28 being representative of means by which the wellhead components 10 and 12 may be attached to or receive the attachment of other components. The specific means by which the first and second wellhead components are attached to other elements in a wellhead system are not part of this invention. Instead, the essence of this invention is a connection system for quickly and effectively connecting together the ends 18 and 22 respectively of first wellhead component 10 and 12 in which each of the wellhead components has an integral external hub portion as illustrated by hub portions 20 and 24.

The first element making up the coupling system of this invention is a toroidal connector 30 that has an inside dimension greater than the diameter of hub portions 20 and 24. Toroidal connector 30 is, in cross-section, of a C-shaped configuration, that is, it has a tubular portion 32, an integral lower inwardly radially extending flange portion 34 and an integral radially extending upward flange portion 36. The lower flange portion 34 has an interior circumferential surface 38 that is of internal diameter slightly greater than the external diameter of hubs 22 and 24. The upper flange 36 has an internal circumferential surface 40 that, in the illustrated embodiment, is threaded. The threaded circumferential surface 36 engages an external threaded area 42 formed on second wellhead component 22 adjacent to and spaced above hub 24. This permits toroidal connector 30 to be threaded onto second wellhead component 12. The provision of threads 40 and 42 is not mandatory in practicing the invention but is a useful supplementary feature to the basic concept of the invention.

Forming a backup to the threaded relationship between toroidal connector 30 and second wellhead component 12 is a short length radially extending flange 44 formed as a part of second wellhead component 12, flange 44 being immediately adjacent threads 42.

Figure 2:
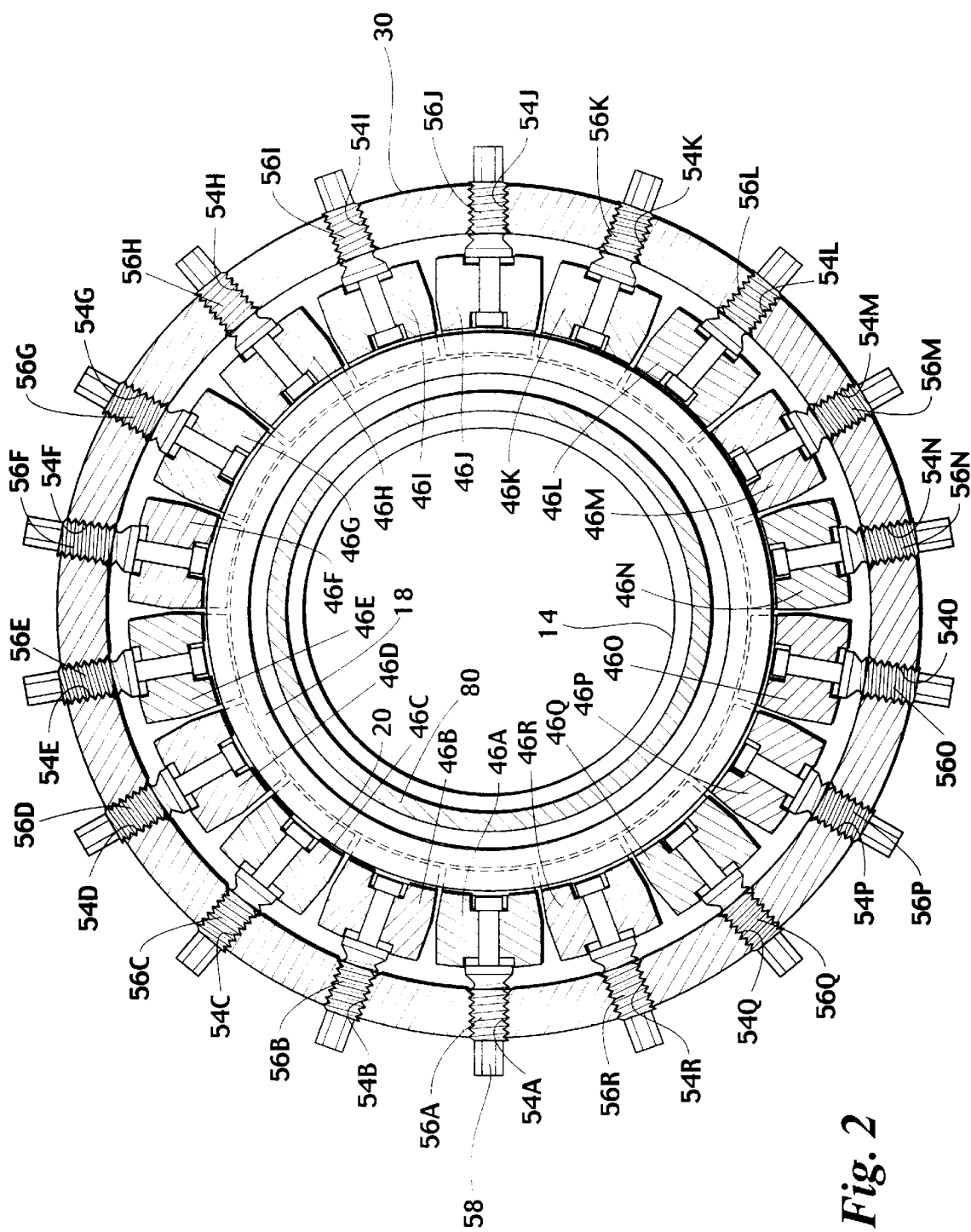
FIG. 2 is a horizontal cross-sectional view taken along the line 2—2 of FIG. 1 showing the components making up the connecting system of this invention by which the two wellhead components are secured to each other.

The physical elements that selectably maintains first and second wellhead components 10 and 12 in secured axial alignment are a plurality of C-segments which, referring to FIG. 2, are indicated by the numerals 46A through 46R. That is, in the illustrated embodiment eighteen C-segments 46 are employed, it being understood that the numbers of these C-segments can vary considerably and while not directly proportional to the diameter of wellhead components 10 and 12, in the preferred practice of the invention, the number of C-segments will typically increase as the diameter of the wellhead components increase. FIG. 1 shows in cross-section C-segments 46A and 46J, that is, the C-segments that are directly opposite each other as seen in FIG. 2. Each C-segment 46 is a short length integral member, each having an inwardly extending upper circumferential flange portion 48 and spaced therefrom a lower flange portion 50. The spacing between the C-segment flange portions 48 and 50 corresponds to the combined elevational dimensions of hub portions 20 and 24. The C-segments 46 and hub portions 20 and 24 have sloped surfaces shaped to mate with each other.

Each of the C-segments 46 has a central opening 52 therein. The C-segments 46 are configured to be radially displaced relative to toroidal connector 30. The C-segments are slidably positioned within toroidal connector 30 and between connector lower flange portion 34 and upper flange portion 36. The slidable displacement of the C-segments relative to toroidal connector 30 permits the coupling system to be positioned onto and removed from wellhead components 10 and 12 and permits the components to be coupled together or decoupled according to the position of the C-segments.

Toroidal connector 30 has a radial threaded opening therein for each of the C-segments. As shown in FIG. 2, toroidal connector 30 has threaded openings 54A through 54R, threaded openings 54A and 54J being seen in FIG. 1.

Figure 5:
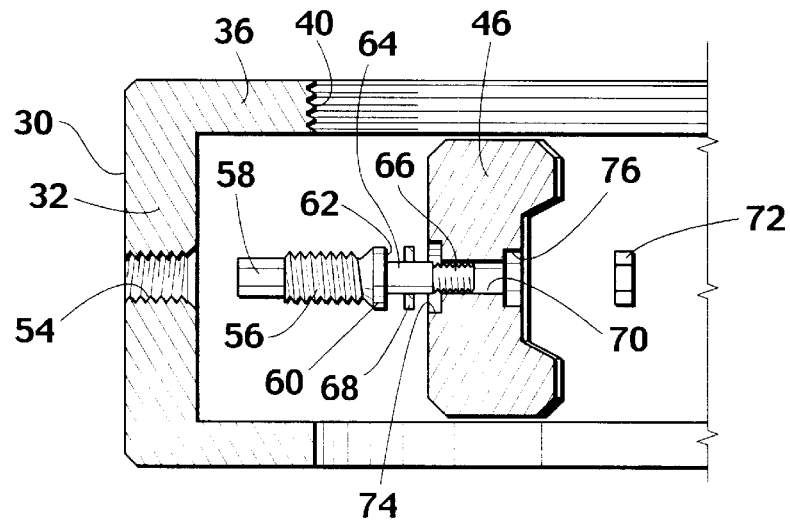
FIG. 5 is an enlarged fragmentary elevational exploded cross-sectional view of portions of the toroidal connector and a C-segment and showing how a positioning bolt and a C-segment are interconnected.
Figure 6:
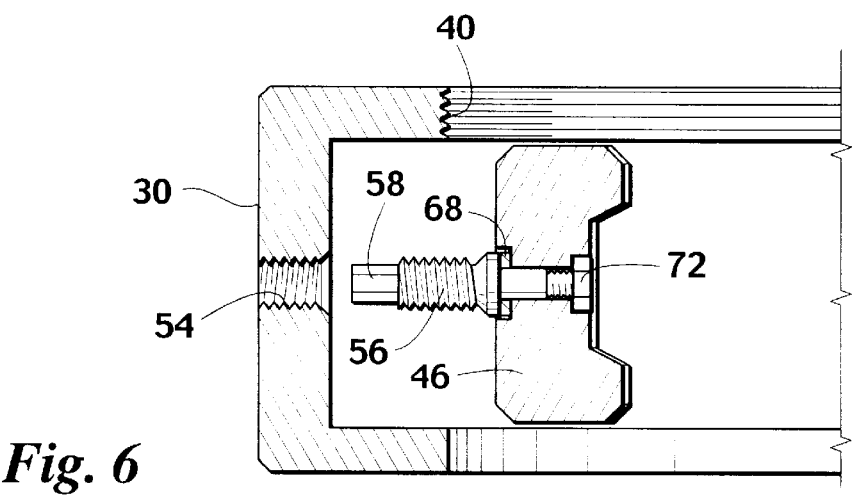
FIG. 6 is a view as in FIG. 5 but showing the positioning bolt and C-segment assembled.
Figure 7:
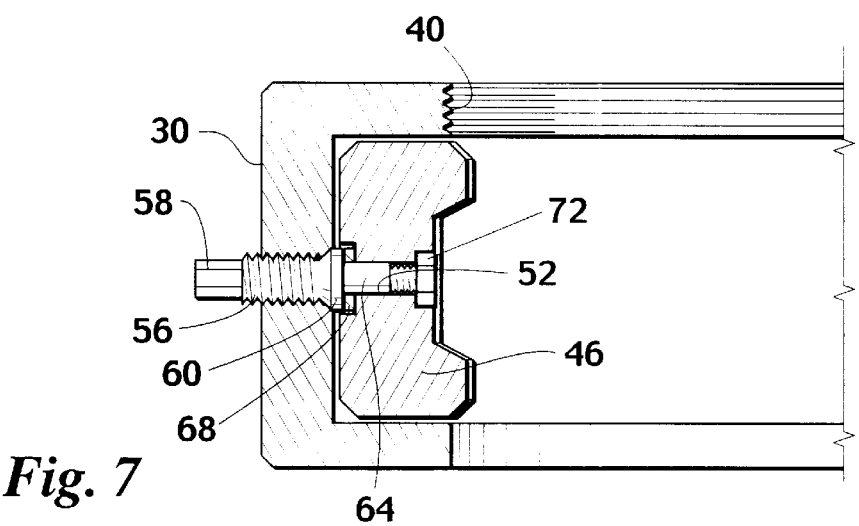
FIG. 7 is a view as in FIGS. 5 and 6 but showing the C-segment and positioning bolt assembled with the toroidal connector and the C-segment in its fully withdrawn position.

Received in each of the threaded openings 54A through 54R is a positioning bolt indicated by letters 56A through 56R in FIG. 2, positioning bolts 56A and 56J being seen in FIG. 1. The function of positioning bolts 56 is to radially inwardly and outwardly position C-segments 46. Referring to FIGS. 5, 6 and 7, the details of the construction of positioning bolts 56 will be better understood. FIG. 5 is an exploded view showing toroidal connector 30 in cross-section with an externally threaded positioning bolt 56 shown in alignment to be threadably positioned in threaded opening 54. Bolt 56 has at a first end thereof a wrench surface 58 by which the bolt is rotated. In the illustrated arrangement, wrench surface 58 is hexagonal although it could be square or it could be in the form of a hexagonal recess for receiving an Allen wrench. Spaced from wrench surface 58 and on the opposite end of the threaded portion of bolt 56 is an integral increased external diameter flange portion 60 that has a forward flange face 62. Integrally and coaxially extending from bolt 56 is a reduced external diameter cylindrical shaft 64 that has external threads 66 on the outer end thereof. Slidably received on shaft 64 is a thrust washer 68.

Shaft 66 is dimensioned to be rotatably received within an opening 70 centrally positioned in C-segment 46. Threadably received on the outer end of shaft 66 is a nut 72.

Opening 70 in each C-segment has an enlarged diameter portion 74 that is dimensioned to receive thrust washer 68 and bolt flange portion 60. At the opposite or inner end of opening 70 the dimension of the opening is enlarged at 76 and dimensioned to receive nut 72.

FIG. 6 shows positioning bolt 56 attached to a C-segment 46, that is, wherein nut 72 is threadably positioned on the outer end of shaft 64.

FIG. 7 shows the C-segment 46 and positioning bolt 56 in position within toroidal connector 30 as the C-segments and bolts are positioned when the coupling system is to be placed onto or removed from a wellhead assembly or when the system is in condition to permit the first and second wellhead components 10 and 12 as shown in FIG. 1 to be joined to or separated from each other.

Figure 3:
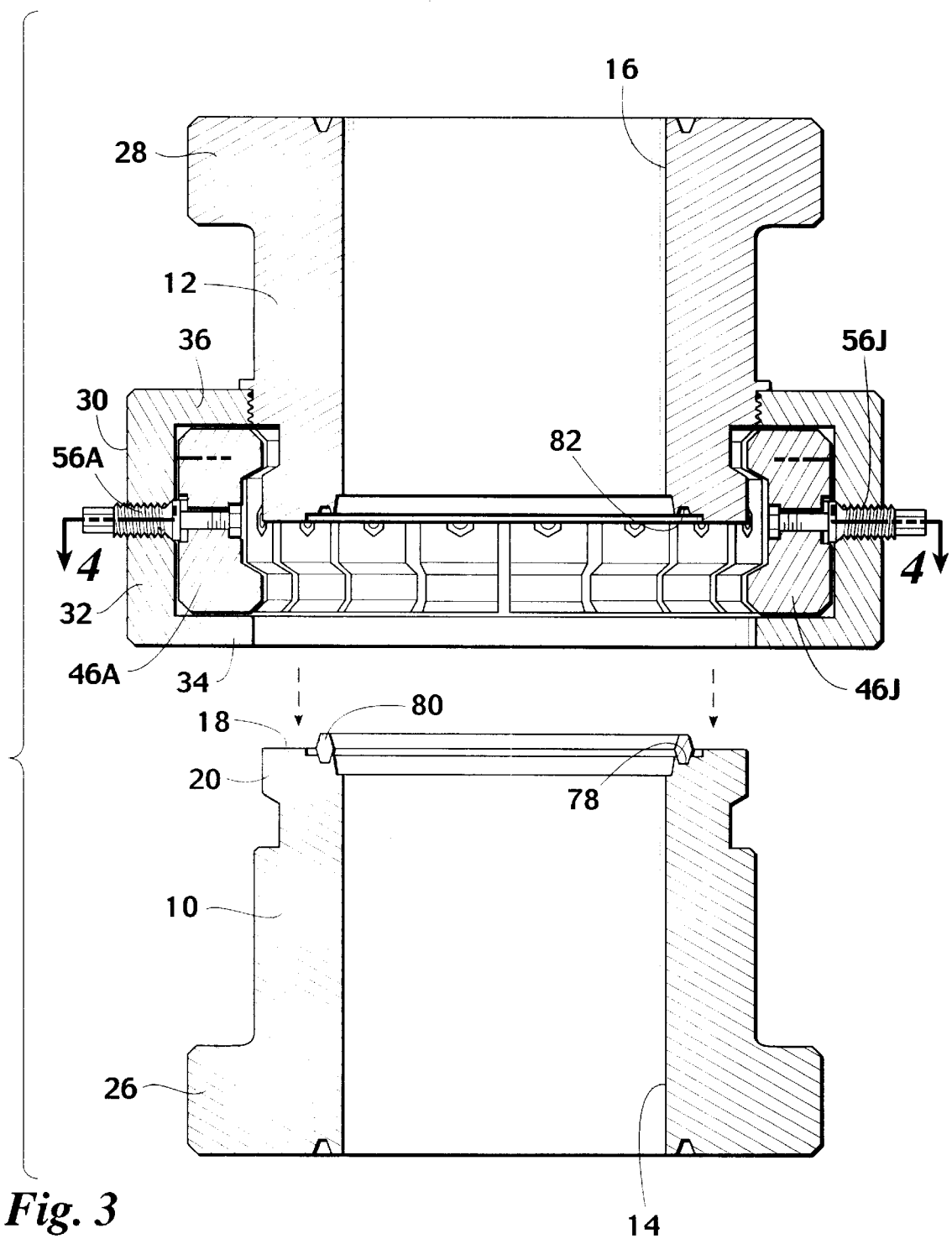
FIG. 3 is an exploded view of the system of FIG. 1 showing the C-segments having been moved to their outward positions and showing the wellhead components having been separated from each other.

FIG. 3 is an exploded view showing the first and second wellhead components 10 and 12 separated from each other. First wellhead component 10 is shown as having a circumferential recess 78 in the upper end 18 thereof which receives a toroidal seal ring 80, the ring finding a matching circumferential recess 82 in second wellhead component lower end 22. The sealing system including seal ring 80 as shown by way of illustration only and does not form a part of the invention but is indicative of ways in which the first and second wellhead components 10 and 12 may be sealed with respect to each other.

FIG. 3 shows the coupling system secured to the lower portion of second wellhead component 12 wherein the second wellhead component is ready to be secured to first wellhead component 10. As shown in FIG. 3, the C-segments (46A and 46J being shown in cross-section) are fully retracted. This is accomplished by threading of positioning bolts 56 in the radially outwardly direction. With the C-segments fully retracted the second wellhead component 12 can be positioned onto the first wellhead component 12. FIG. 3 shows toroidal connector 30 threadably attached to the lower portion of second wellhead component 12 which provides a convenient and efficient way of employing the system of this invention, however it is understood that the system can be employed if the toroidal connector ring 30 is not threadably attached to either of the wellhead components. It can be seen that if the toroidal ring is not threadably attached to second wellhead component 12 it can be positioned on and around first wellhead component 10 and then the wellhead components 10 and 12 align with each other after which the coupling system is raised into position during which the C-segments are inwardly advanced to the position as shown in FIG. 1.

Figure 4:
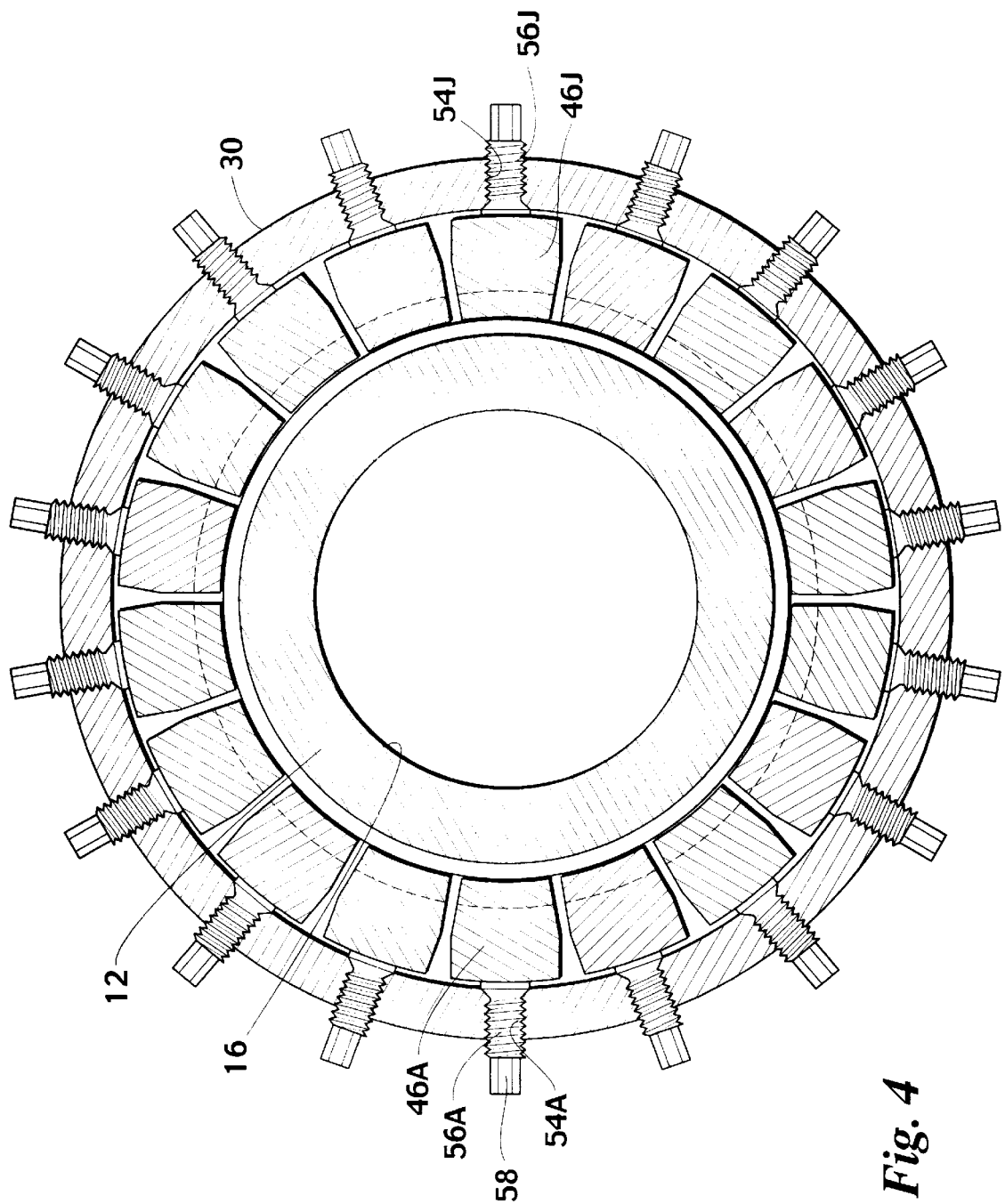
FIG. 4 is a horizontal cross-sectional view taken along the line 4—4 of FIG. 3, and incomparable to FIG. 2, except that FIG. 4 shows the C-segments in their withdrawn positions which allows the wellhead components to be either joined or is separated.

FIG. 4 is a cross-sectional view taken along the line 4—4 of FIG. 3 showing the C-segments fully retracted as in the position wherein the coupling system is in condition for coupling together or for decoupling wellhead components.

The coupling system in adaptable for expediently interconnecting two wellhead components. It can be seen with respect to FIG. 3 that when second wellhead component 12 is lowered in position to engage first wellhead component 10 all that is necessary to sealably and structurally interconnect the two wellhead components is to then threadably inwardly advance positioning bolts 56 which can be expeditiously accomplished using an electrically or mechanically powered torque wrench so that the entire connection can be expeditiously made and, in the same manner, disassembly can be expeditiously accomplished by using a torque wrench to rotate the bolts in the opposite direction to radially outwardly advance the bolts and C-segments.

The system of this invention has advantages over other known systems in that the wellhead components illustrated by the elements 10 and 12 in the drawings are simply constructed at their connecting ends. That is, the components require only the provision of integral radial hubs and do not require any openings or threaded recesses or other types of machining as is common in other kinds of coupling systems.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A system coupling together in abutted axial alignment first and second tubular members each having an increased external diameter circumferential hub at an end thereof providing opposed inclined hub surfaces, comprising:

a toroidal connector surrounding said adjacently positioned hubs of said first and second tubular members;

a plurality of C-segments retained by said toroidal connector each C-segment having opposed inclined surfaces for engagement with said opposed inclined surfaces of said adjacently positioned hubs, said toroidal connector having a radially extending threaded opening therethrough for each C-segment; and a plurality of positioning bolts, a positioning bolt being received in each said threaded opening, each bolt having an inner end in engagement with a said C-segment and an outer end extending radially of and exteriorly of said toroidal connector, each positioning bolt being rotatable to radially advance or retract a said C-segment, said opposed inclined surfaces of each said C-segment when radially inwardly advanced engaging said opposed inclined surfaces of said hubs of said first and second tubular members by which said tubular members are held in abutted axial alignment with each other.

2. A system for coupling together first and second tubular members according to claim 1 wherein said toroidal connector has an internal concave circumferential recess therein that slidably receives said C-segments.

3. A system for coupling together first and second tubular members according to claim 2 wherein said toroidal member is formed by a circumferential short length tubular portion and first and second ring shaped planar members each secured at an outer circumferential edge to said tubular portion.

4. A system for coupling together first and second tubular members according to claim 1 wherein each said C-segments has an opening therethrough and wherein an inner end portion of a said positioning bolt is received therein.

5. A system for coupling together first and second tubular members according to claim 4 wherein each said positioning bolt has an enlarged external diameter portion at the bolt outer end and an intermediate enlarged external diameter portion, a said C-segment being captured between said enlarged diameter portions of each said positioning bolt whereby when a said positioning bolt is rotated in one direction a said C-segment is inwardly advanced and when said positioning bolt is rotated the opposite direction said C-segment is outwardly withdrawn from engagement with said hubs of said first and second tubular members.

6. A tubular component connecting system comprising:

a first tubular member having a planar end having an increased external diameter circumferential hub portion;

a second tubular member having a planar end having an increased external diameter circumferential hub portion, the first and second tubular members being in axial alignment with said hub portions in adjacent relationship with each other;

a toroidal connector surrounding said adjacently positioned hub portions of said first and second tubular members;

a plurality of C-segments retained by said toroidal connector and configured for engagement with opposed surfaces of said hub portions, said toroidal connector having a threaded opening therethrough for each C-segment; and a positioning bolt received in each said threaded opening, each bolt having an inner end in engagement with a C-segment and an outer end extending radially of and exteriorly of said toroidal connector by which each positioning bolt may be rotated to inwardly radially advance or retract a said C-segment, each C-segment when radially inwardly advanced engaging opposed sides of said hub portions of said first and second tubular members by which said tubular members are held in axial aligned relationship with each other.

7. A tubular component connecting system according to claim 6 wherein said toroidal connector has an internal concave circumferential recess therein that slidably receives said C-segments.

8. A tubular component connecting system according to claim 7 wherein said toroidal connector is formed by a circumferential short length tubular portion and first and second ring shaped planar members each secured at an outer circumferential edge to said tubular portion.

9. A tubular component connecting system according to claim 6 wherein each said C-segment has an opening therethrough and wherein an inner end portion of a said positioning bolt is received therein.

10. A tubular component connecting system according to claim 9 wherein each said positioning bolt has an enlarged external diameter portion at the bolt outer end and an intermediate enlarged external diameter portion, a said C-segment being captured between said enlarged diameter portions of each said positioning bolt whereby when a said positioning bolt is rotated in one direction a said C-segment is inwardly advanced and when said positioning bolt is rotated the opposite direction said C-segment is outwardly withdrawn from engagement with said hubs of said first and second tubular members.

* * * * *